(12) United States Patent
Steimer et al.

(10) Patent No.: US 6,621,719 B2
(45) Date of Patent: Sep. 16, 2003

(54) CONVERTER WITH ADDITIONAL VOLTAGE ADDITION OR SUBTRACTION AT THE OUTPUT

(75) Inventors: Peter Steimer, Unterehrendingen (CH); Martin Veenstra, Lausanne (CH)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 10/123,321

(22) Filed: Apr. 17, 2002

(65) Prior Publication Data

US 2003/0026111 A1 Feb. 6, 2003

(30) Foreign Application Priority Data

Apr. 25, 2001 (EP) ............................... 01810402

(51) Int. Cl.[7] ............................................... H02M 1/12
(52) U.S. Cl. ..................................................... 363/43
(58) Field of Search .............................. 363/71, 43, 63, 363/65, 129, 132, 136; 307/82, 45; 327/129

(56) References Cited

U.S. PATENT DOCUMENTS

| 5,642,275 A | 6/1997 | Peng et al. | |
| 5,805,437 A | * 9/1998 | Gruning | 363/71 |
| 6,005,788 A | 12/1999 | Lipo et al. | |

FOREIGN PATENT DOCUMENTS

| DE | 19615855 A1 | 10/1997 |
| DE | 19720787 A1 | 11/1998 |
| EP | 0802617 A2 | 10/1997 |
| EP | 0844831 A2 | 12/1998 |

OTHER PUBLICATIONS

Martin Veenstra et al., "PWM–Control of Multi–Level Voltage–Source Inverters", IEEE PESC'00, Jun. 18–23, 2000, Galway, Ireland.

* cited by examiner

*Primary Examiner*—Shawn Riley
(74) *Attorney, Agent, or Firm*—Burns, Doane, Swecker & Mathis, L.L.P.

(57) ABSTRACT

A circuit for transmitting real power from a DC voltage side to AC voltage-side connections has a first power converter (4) with load connections (5) connected in series with second power converters (7) having a lower intermediate-circuit capacitor voltage. This allows finer voltage graduation of a sum voltage at the AC voltage-side connections (10). Voltages of intermediate-circuit capacitances of power converters (4, 7) and a common-mode voltage of the AC voltage-side connections can be jointly regulated. The intermediate-circuit capacitor voltages can be kept essentially constant. The second power converters (7) can interchange real power with a load (11) and the first power converter (4). Changes in the intermediate-circuit capacitor voltages can be calculated in advance using a model of the converter. The common-mode voltage can be selected to minimize a weighted sum of the squares of the errors between the intermediate-circuit capacitor voltages and the respective nominal values.

11 Claims, 4 Drawing Sheets

CONVERTER WITH ADDITIONAL VOLTAGE ADDITION OR SUBTRACTION AT THE OUTPUT

FIELD OF THE INVENTION

The invention relates to the field of power electronics.

BACKGROUND OF THE INVENTION

A circuit arrangement such as this is known, for example, from DE-A-196 15 855. This circuit arrangement has a first power converter, which is connected to a DC voltage source having a first intermediate-circuit capacitor voltage and has three load connections, as well as second power converters, which are connected between the load connections and AC voltage-side connections for a load. At least one second intermediate-circuit capacitor voltage or, if not, zero volts, can be added to or subtracted from a voltage at the respective load connection, by means of one of the second power converters. In this case, the second intermediate-circuit capacitor voltage is less than the first intermediate-circuit capacitor voltage. This makes it possible to achieve a voltage graduation, which is finer than that of the first intermediate-circuit capacitor voltage, for a voltage at the AC voltage-side connections or across the load. A predetermined mean voltage is set at the AC voltage-side connections by the first power converter roughly setting a voltage value in the vicinity of the predetermined voltage, and the second power converter adjusting any remaining difference with respect to the predetermined voltage by pulse duration modulation. In this case, the second power converter is clocked at a faster rate than the first. The second power converters are each fed by means of their own converters and a joint supply transformer. DE-A 197 20 787 describes a method which avoids any feedback of power from the second power converters so that the corresponding converters for supplying the second power converters may be pure rectifiers, that is to say they do not need to have any feedback capability and are thus cheaper. However, both cited cases involve complexity for supplying the second power converters.

SUMMARY OF THE INVENTION

One object of the invention is to provide a power-electronic circuit arrangement for transmitting real power of the type mentioned initially, which has a simpler design, and to provide a method for operating this circuit arrangement.

An exemplary circuit arrangement according to the invention has a first power converter and at least one second power converter, with the at least one second power converter not having its own power supply means. Thus, in addition to the connections for the respective load connections of the first power converter and for the respective AC voltage-side connection, the at least one second power converter has no further connections or means for transmitting real power or real energy to or from the second DC voltage intermediate circuit.

There is thus no need for the initially mentioned rectifiers for supplying the second power converters, as a result of which the circuit arrangement becomes considerably simpler, cheaper and more reliable.

In one preferred embodiment, the circuit arrangement according to the invention has a regulating device for joint regulation of at least one intermediate-circuit capacitor voltage of the at least one second power converter, and of a common-mode voltage at the AC voltage-side connections of the circuit arrangement, as well as means for driving semiconductor switches in the first power converter and in the at least one second power converter on the basis of output variables from this regulating device.

This makes it possible to keep mean values, over time, of the voltages of the intermediate-circuit capacitances of the at least one second power converter and, possibly, of the first power converter essentially constant, even though the second power converters are interchanging real power with a load and with the first power converter.

In a further preferred embodiment of the invention, a second power converter is in each case connected in series between a load connection of the first power converter and the associated AC voltage-side connection, with these second power converters each having two two-point inverter bridges. Nominal voltages of the intermediate-circuit capacitors in the first power converter and in the second power converters preferably have a ratio of 2:1 or 3:1. A voltage at the AC voltage-side connections can thus be adjusted with a graduation of 5 to 9 steps, as is shown in the following table:

| First power converter | Second power converter | Voltage ratio | Number of steps |
| --- | --- | --- | --- |
| 2 point | 2 point | 2:1 | 5 |
| 2 point | 2 point | 3:1 | 6 |
| 3 point | 2 point | 2:1 | 7 |
| 3 point | 2 point | 3:1 | 9 |

In a further preferred embodiment of the invention, a second power converter is in each case connected in series between a load connection of the first power converter and the associated AC voltage-side connection, with these second power converters each having a two-point inverter bridge and a three-point inverter bridge. Nominal voltages of the intermediate-circuit capacitors in the first power converter and in the second power converters preferably have a ratio of 2:1, 3:1, 4:1 or 5:1. The voltage at the AC voltage-side connections can thus be adjusted with a graduation of 7 to 15 steps, as shown in the following table:

| First power converter | Second power converter | Voltage ratio | Number of steps |
| --- | --- | --- | --- |
| 2 point | 2/3 point | 2:1 | 7 |
| 2 point | 2/3 point | 3:1 | 8 |
| 2 point | 2/3 point | 4:1 | 9 |
| 2 point | 2/3 point | 5:1 | 10 |
| 3 point | 2/3 point | 2:1 | 9 |
| 3 point | 2/3 point | 3:1 | 11 |
| 3 point | 2/3 point | 4:1 | 13 |
| 3 point | 2/3 point | 5:1 | 15 |

In a further preferred embodiment of the invention, two second power converters are in each case connected in series between a load connection of the first power converter and the associated AC voltage-side connection, with these second power converters each having two two-point inverter bridges. The voltage at the AC voltage-side connections can thus be adjusted with a graduation from 7 up to a maximum of 27 steps. Nominal voltages of the intermediate-circuit capacitors in the first power converter and in the second power converters preferably have a ratio of 4:1:1, 5:1:1, 6:2:1, 7:2:1, 8:3:1 or 9:3:1.

In an exemplary method according to the invention, at least one voltage of at least one intermediate-circuit capacitance of the at least one second power converter and a common-mode voltage of the AC voltage-side connections of the circuit arrangement are regulated by means of joint regulation. In one preferred variant of the invention, the joint regulation also takes account of a voltage of the intermediate circuit in the first power converter, in particular a neutral point voltage in the intermediate circuit. The joint regulation influences the regulated voltages, taking account of a joint optimization criterion.

In one preferred variant of the invention, a weighted sum of the squares of the errors between the regulated voltages and a respective nominal value is minimized.

BRIEF DESCRIPTION OF THE DRAWINGS

The subject matter of the invention will be explained in more detail in the following text with reference to preferred exemplary embodiments, which are illustrated in the attached drawings, in which.

The reference symbols used in the drawings, and their meanings, are listed in summary form in the List of Reference Symbols. In principle, identical parts in the figures are provided with the same reference symbols.

DETAILED DESCRIPTION OF THE INVENTION

Figure 1:
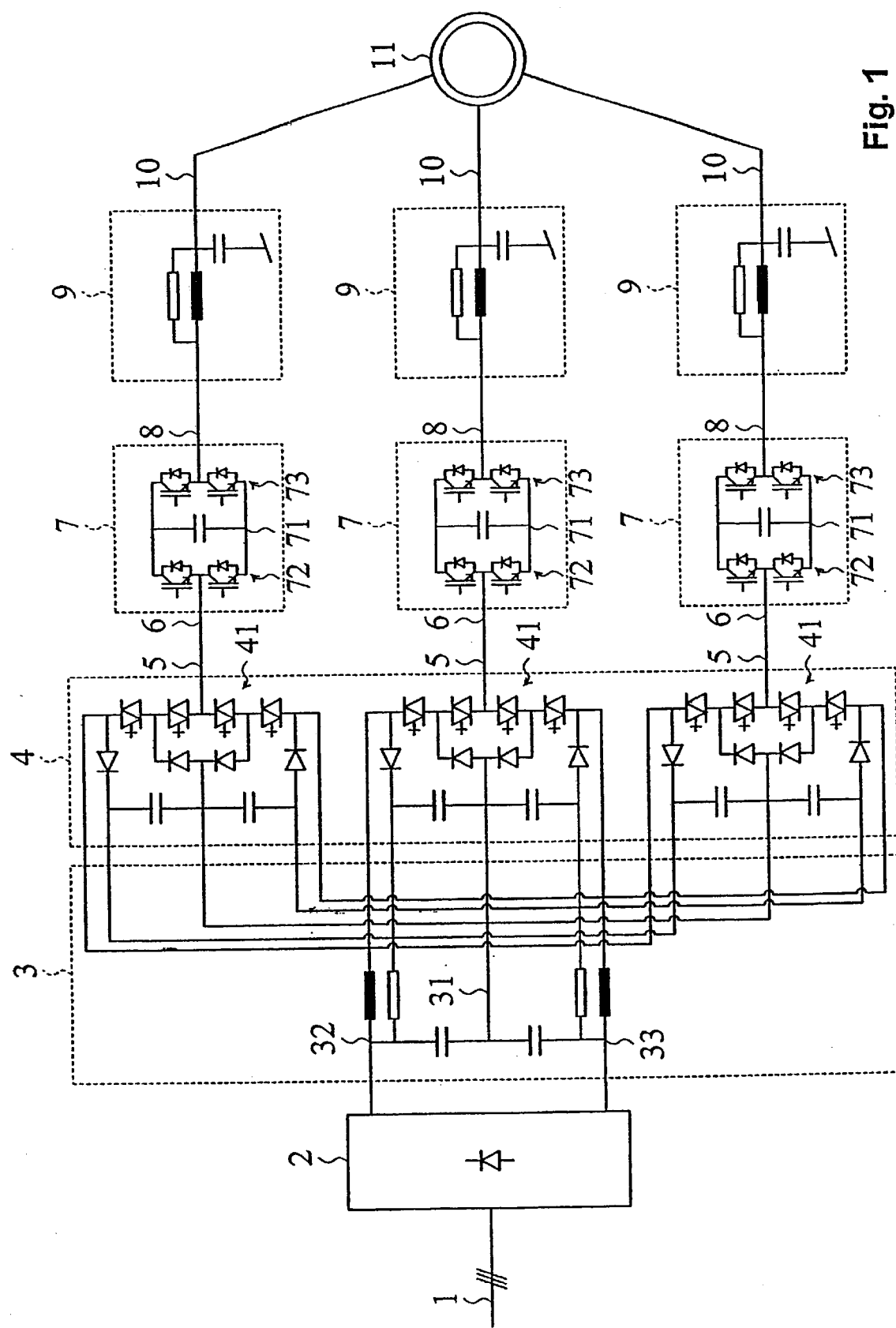
FIG. 1 shows a circuit diagram of a circuit arrangement according to the invention, in conjunction with a load and a supply.

FIG. 1 shows a circuit arrangement according to the invention, in conjunction with a load and a supply. The circuit arrangement is used for transmitting real power from a DC voltage side to at least two AC voltage-side connections 10, or vice versa. The DC voltage side is, for example, a first DC voltage intermediate circuit 3. This has a first intermediate-circuit capacitor voltage, a first positive pole 32 and a first negative pole 33, and is fed by a rectifier 2, normally via a network transformer 12, from a power supply network 1. The rectifier 2 is preferably a converter with a feed back capability, that is to say it has the capability to transmit power from the first DC voltage intermediate circuit 3 into the power supply network 1. In another embodiment of the invention, the rectifier 2 is a diode rectifier, that is to say without any feedback capability.

Figure 2:
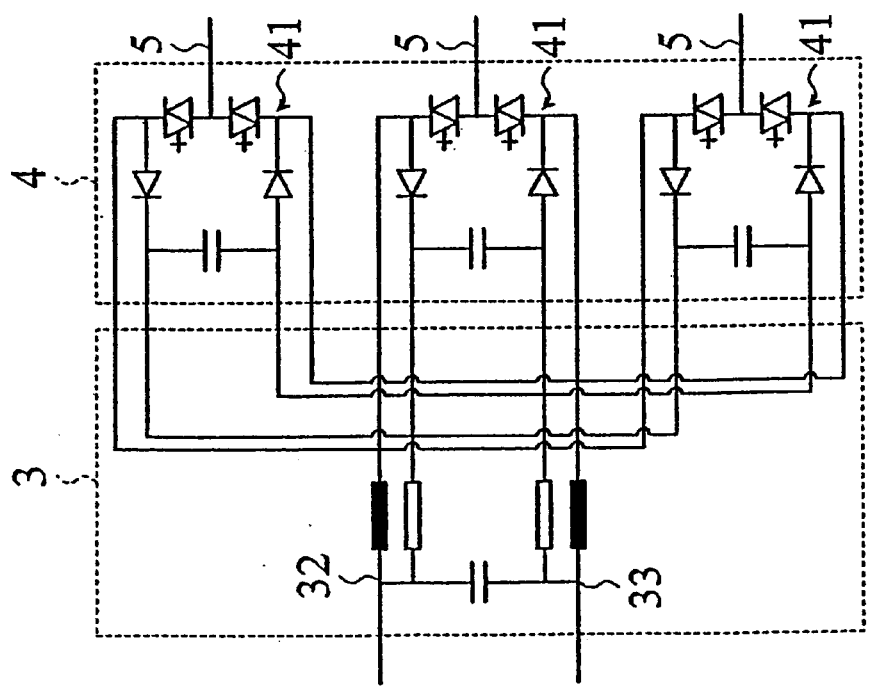
FIG. 2 shows a second embodiment of a first power converter.

The circuit arrangement according to the invention comprises a first power converter 4, which is connected to a DC voltage source or to the first DC voltage intermediate circuit 3. The first converter 4 is a three-point inverter, as shown in FIG. 1, or a two-point inverter, as shown in FIG. 2. The first power converter 4 has at least two load connections 5. The first power converter 4 preferably has a main converter bridge 41 for each load connection. If the first power converter 4 is a three-point inverter, the first DC voltage intermediate circuit 3 has a first neutral point 31. At least either the positive first intermediate-circuit capacitor voltage, the negative first intermediate-circuit capacitor voltage or, in the case of a three-point inverter, zero volts can be connected to each of the load connections 5 by means of the main power converter bridges 41, using the first power converter 4.

The circuit arrangement according to the invention comprises at least one second power converter 7, which has a second DC voltage intermediate circuit 71 with a second intermediate-circuit capacitor voltage, which is connected in parallel with a first and a second converter bridge 72, 73. The at least one second power converter 7 is connected to one of the load connections 5 via a first bridge connection 6 of the first converter bridge 72, and is connected to an AC voltage-side connection 10 via a second bridge connection 8 of the second converter bridge 73.

In one preferred embodiment of the invention, a sine-wave filter or filter 9 for smoothing a load current or a load voltage is in each case connected between a second bridge connection 8 and an associated AC voltage-side connection 10. A load 11, for example an electrical machine, is connected to the AC voltage-side connections 10. The power converters or their main power converter bridges 41, first converter bridges 72 and second converter bridges 73 have semiconductor switches, for example, IGCTs (Integrated Gate Commutated Thyristors) or IGBTs (Insulated Gate Bipolar Transistors).

FIG. 2 shows a second embodiment of a first power converter 4 and a first DC voltage intermediate circuit 3. In this case, the first power converter 4, the two-point power converter and the intermediate circuit 3 are integral.

Figure 3:
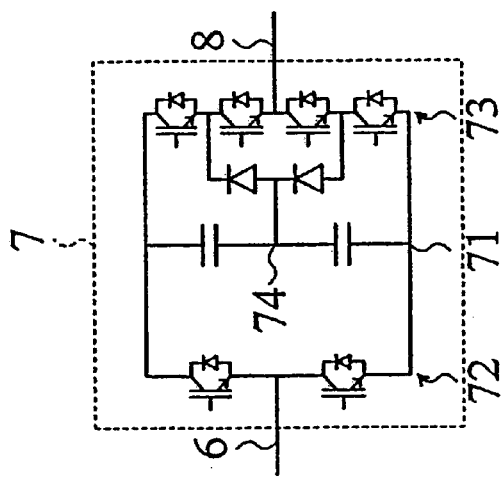
FIG. 3 shows a second embodiment of a second power converter.

FIG. 3 shows a second embodiment of a second power converter 7. In this embodiment, the second DC voltage intermediate circuit 71 is in two parts, with a second neutral point 74, and the second converter bridge 73 is in the form of a three-point inverter. This embodiment of the second power converter 7 is referred to as a 2/3-point power converter. Either the second intermediate-circuit capacitor voltage, twice the second intermediate-circuit capacitor voltage or zero volts can thus be added to or subtracted from the voltage at the corresponding load connection 5. In a further variant, the first converter bridge 72 is also in the form of a three-point inverter. In principle, any desired combinations of two-point and three-point inverters are possible, in particular the combinations which are described and claimed in DE-A-196 15 855.

Figure 4:
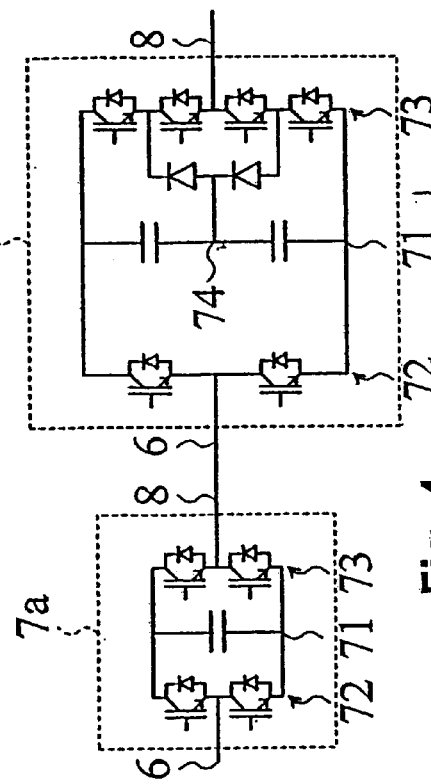
FIG. 4 shows a series circuit of two second power converters per load connection, according to a further embodiment of the invention.

FIG. 4 shows a series circuit of two second power converters 7a, 7b per load connection, according to a further embodiment of the invention. The second power converters 7 are connected in series via their first bridge connections 6 and second bridge connections 8. A first bridge connection 6 of a first second power converter 7a is thus connected to a load connection 5, and a second bridge connection 8 of the first second power converter 7a is connected to a first bridge connection 6 of the second second power converter 7b, and a second bridge connection 8 of the second second power converter 7b is connected to a filter 9 or to an AC voltage-side connection 10. In principle, the various embodiments of second power converters 7a, 7b described above can be combined with one another as required, that is to say the first second and the second second power converters are 2-point and/or 3-point and/or 2/3-point converters.

One or more of:
the positive second intermediate-circuit capacitor voltage,
the negative second intermediate-circuit capacitor voltage, or
zero volts
can be added, by means of the at least one second power converter (7), to a voltage value which is connected by the first power converter (4) to its load connection (5). In addition, twice the second intermediate-circuit capacitor voltage can also be added or subtracted by means of a three-point inverter. The added voltage is applied to the second bridge connection 8 or to the corresponding AC voltage-side connection 10. The second intermediate-circuit capacitor voltage is preferably different to the first intermediate-circuit capacitor voltage, in order to allow finer voltage graduation than a voltage graduation of the first power converter 4 at the AC voltage-side connections 10. This principle of refined voltage graduation is explained further in the initially mentioned DE-A-196 15 855 and DE-A 197 20 787. The majority of the output voltage, that is to say the voltage at the AC voltage-side connections 10, is formed by the first power converter 4, which is clocked slowly and is preferably equipped with IGCTs (Integrated Gate Commutated Thyristors). The lesser proportion of the output voltage is formed by the second power converters 7, which are driven, for example, using pulse duration modulation and are equipped with IGBTs (Insulated Gate Bipolar Transistors). The switching frequency of the first power converter 4 is at least approximately 50 to 300 Hz, while the switching frequency of the second power converter 7 is at least approximately 300 to 1000 Hz. The fundamental frequency of the output voltage is, for example, 0 to 60 or 300 Hz.

In one example of the design of the first DC voltage intermediate circuit 3 for the arrangement as shown in FIG. 1, with a nominal intermediate-circuit capacitor voltage of the first power converter 4 of 2 kV and of the second power converter 7 of 1 kV, the resultant voltages at an AC voltage-side connection 10 with respect to the first and neutral point 31 are produced in accordance with the following table. The term "nominal intermediate-circuit capacitor voltage" refers to a voltage for which an intermediate-circuit capacitor and the associated converter are designed. In the case of a two-point inverter, this is the total voltage across the intermediate circuit, while in the case of a three-point inverter or an intermediate circuit with two capacitors and a neutral point, it is half the total voltage across the intermediate circuit.

| 1st power converter at the load connection 5 | 2nd power converter, between the first bridge connection 6 and the second bridge connection 8 | Resultant voltage, at the second bridge connection 8 or at the AC voltage-side connection 10 |
| --- | --- | --- |
| +2 kV | +1 kV | +3 kV |
| +2 kV | 0 kV | +2 kV |
| +2 kV | −1 kV | +1 kV |
| 0 kV | +1 kV | |
| 0 kV | 0 kV | 0 kV |
| 0 kV | −1 kV | −1 kV |
| −2 kV | +1 kV | |
| −2 kV | 0 kV | −2 kV |
| −2 kV | −1 kV | −3 kV |

The voltage ratio between the nominal voltages of he first DC voltage intermediate circuit 3 and of the second DC voltage intermediate circuits 71 is in this case 2:1. The resultant voltage can thus be switched in seven steps. The design is redundant, since in some cases different switch combinations lead to the same resultant voltage. The following arrangement with a voltage ratio of 3:1 has no redundancies and nine switching steps:

| 1st power converter | 2nd power converter | Resultant voltage |
| --- | --- | --- |
| +3 kV | +1 kV | +4 kV |
| +3 kV | 0 kV | +3 kV |
| +3 kV | −1 kV | +2 kV |
| 0 kV | +1 kV | +1 kV |
| 0 kV | 0 kV | 0 kV |
| 0 kV | −1 kV | −1 kV |
| −3 kV | +1 kV | −2 kV |
| −3 kV | 0 kV | −3 kV |
| −3 kV | −1 kV | −4 kV |

Owing to the greater number of switching steps and the finer voltage graduation, non-redundant arrangements are preferred.

During the operation of the circuit arrangement according to the invention, the second power converters 7 interchange real power with both the load 11 and the first power converter 4. According to the invention, the second power converters 4 do not have their own means for supplying power to the second power converters 7 or for drawing electrical power from the second power converters 7. Thus, apart from the first bridge connection 6 and the second bridge connection 8, they have no further connections or means for transmitting real power to or from the second DC voltage intermediate circuit 71. However, if a second power converter 7 overall emits more power or real power to the load 11 and/or to the first power converter 4, its second intermediate-circuit capacitor voltage falls. Conversely, the second intermediate-circuit capacitor voltage rises, when, overall, the second power converter 7 receives real power from the load 11 and/or from the first power converter 4.

According to the invention, the interchange of real power between the first power converter 4 and the second power converters 7 is regulated such that the regulated voltages, that is to say the voltages on the capacitances in the intermediate circuits, remain approximately constant. Joint regulation, that is to say joint regulation of all the power converters 4, 7 in this case detects the regulated voltages and drives the power converters 4, 7 in a coordinated manner, so as to satisfy an optimization criterion that covers the power converters 4, 7. According to the invention, this can be done by varying or regulating a common-mode voltage at the AC voltage-side connections 10.

If the first power converter 4 is a three-point power converter, the first DC voltage intermediate circuit 3 has a first neutral point 31. The overall voltage of the first DC voltage intermediate circuit 3 is regulated, for example, by the rectifier 2 or, if using a diode rectifier, is kept essentially constant without regulation. The neutral point voltage at the first neutral point 31 must, however, also still be kept approximately constant. In one preferred variant of the invention, the neutral point voltage of the first intermediate circuit is therefore also regulated in such a way, that is to say it is included as a regulated voltage in the joint regulation.

The term "intermediate-circuit capacitor voltage" refers to a voltage value which actually occurs across an intermediate-circuit capacitor during operation. This corresponds to either half the intermediate circuit, or the entire intermediate circuit. The neutral point voltage and the entire voltage of an intermediate circuit with a neutral point are both likewise referred to as intermediate-circuit capacitor voltages. The term "regulated voltage" covers regulated intermediate-circuit capacitor voltages and the regulated common-mode voltage.

The following table shows the three voltage steps which can be switched using a 2/3-point power converter as shown in FIG. 3:

| 1st power converter | 2nd power converter | Resultant voltage |
|---|---|---|
| +2.5 kV | +1 kV | +3.5 kV |
| +2.5 kV | +0.5 kV | +3 kV |
| +2.5 kV | 0 kV | +2.5 kV |
| +2.5 kV | −0.5 kV | +2 kV |
| +2.5 kV | −1 kV | +1.5 kV |
| 0 kV | +1 kV | +1 kV |
| 0 kV | +0.5 kV | +0.5 kV |
| 0 kV | 0 kV | 0 kV |
| 0 kV | −0.5 kV | −0.5 kV |
| 0 kV | −1 kV | −1 kV |
| −2.5 kV | +1 kV | −1.5 kV |
| −2.5 kV | +0.5 kV | −2 kV |
| −2.5 kV | 0 kV | −2.5 kV |
| −2.5 kV | −0.5 kV | −3 kV |
| −2.5 kV | −1 kV | −3.5 kV |

The voltage ratio between the nominal voltages of the first DC voltage intermediate circuit 3 and of the second DC voltage intermediate circuit 71 is in this case 5:1. The table shows 15 switching steps and no redundancies. With a voltage ratio of 4:1, there are 13 different steps (2 redundant steps), and with a voltage ratio of 3:1, there are 11 different steps (4 redundant steps).

If two second power converters 7 per load connection 5 are connected in series, the voltage steps which can be switched are the same as those with a single 2/3-point power converter as shown in FIG. 3, provided the series-connected second power converters 7 have the same nominal intermediate-circuit capacitor voltage.

If the nominal intermediate-circuit capacitor voltages of series-connected second power converters 7 differ, then up to 27 switching steps are possible. The following table quotes, for preferred embodiments of the invention, the number of switching steps as a function of the voltage ratios of the nominal intermediate-circuit capacitor voltages of the first power converter 4 (Ucm), of a first series-connected second power converter 7 (Ucs1) and of a second series-connected second power converter 7 (Ucs2).

| Ucm:Ucs1:Ucs2 | Number of switching steps |
|---|---|
| 4:1:1 | 13 |
| 5:1:1 | 15 |
| 6:2:1 | 19 |
| 7:2:1 | 21 |
| 8:3:1 | 25 |
| 9:3:1 | 27 |

Both the use of three-point inverters in the second power converters 7 and the series connection of a number of second power converters 7 allow finer graduation of the voltage at the AC voltage-side connections 10 than the voltage graduation of the first power converter 4. In each case, the voltages of the individual capacitances in the second power converters 7 are regulated by the joint regulation.

In summary, the joint regulation regulates the regulated voltages, that is to say the voltages of the intermediate-circuit capacitances of the second power converters 7 and, possibly, of the first power converter 4, in particular the neutral point voltage. This is done by using suitable voltage measurement equipment to determine measured values for the regulated voltages.

Figure 5:
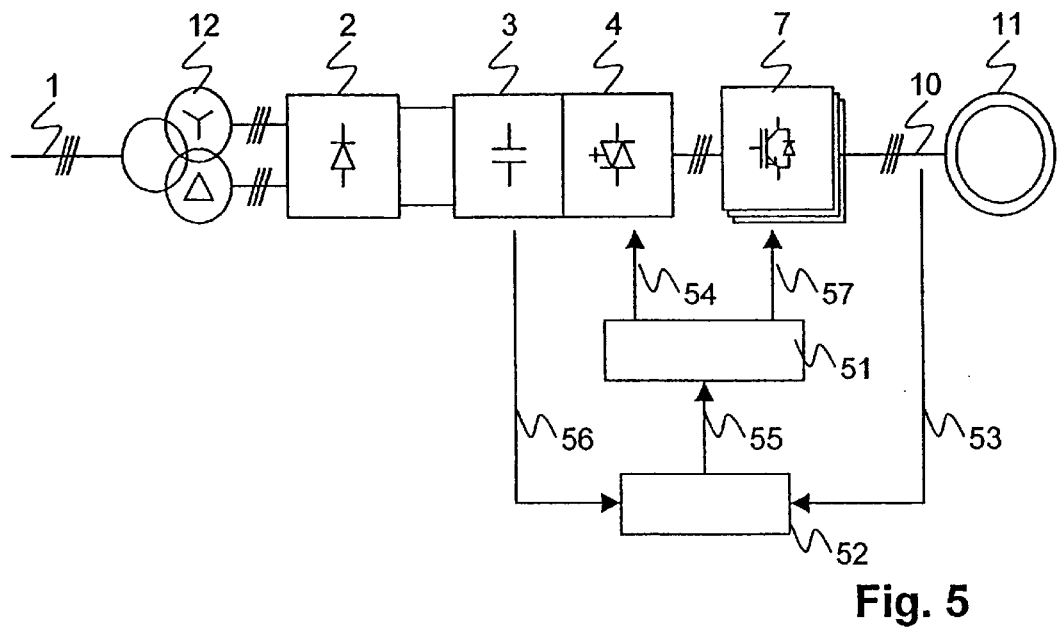
FIG. 5 shows a control diagram of regulation according to the invention in conjunction with a circuit arrangement according to the invention.

FIG. 5 shows a control diagram of regulation according to the invention in conjunction with a circuit arrangement according to the invention as shown in FIG. 1. The joint regulation according to the invention operates as follows: higher-level load regulation 52 detects one or more intermediate-circuit voltage values 56 of the intermediate-circuit capacitances in the first DC voltage intermediate circuit 3, as well as output voltage values 53 at the AC voltage-side connections 10. The higher-level load regulation 52 presets load voltage nominal values 55 for an intermediate-circuit voltage regulator 51, which nominal values 55 must be present, relative to one another, at the AC voltage-side connections 10, in order to drive the load 11 (which is, in particular, a drive motor) in the desired manner. Presetting the output voltage at the AC voltage-side connections 10 with a non-redundant design of the circuit arrangement according to the invention results in the switches in the power converters or a modulation level for pulse width modulation in the second power converters 7 being produced unambiguously.

According to the invention, a common, so-called common-mode, voltage is added to the load voltage nominal values 55 for each phase in the intermediate-circuit voltage regulator 51, in order to influence the real power flow between the converters, or in order to influence the regulated voltages for the intermediate-circuit capacitances. The sums of the load voltage nominal values 55 and the common-mode voltage are referred to as the modified load voltage nominal values. The modified load voltage nominal values are used, in the intermediate-circuit voltage regulator 51, to define a modulation level 54 for the first power converter 4 and modulation levels 57 for the second power converters 7, so that the modified load voltage nominal values are produced at the AC voltage-side connections 10. This is done by measuring the voltages of preferably all the intermediate-circuit capacitors in the first power converter 4 and in the second power converters 7, and by also processing them in the intermediate-circuit voltage regulator 51.

The following terms are used: a maximum converter output voltage is equal to the sum of the intermediate-circuit capacitor voltages of the series-connected first and second power converters. A drive level is equal to the ratio between the present and the maximum converter output voltage for a steady-state operating point in the entire converter, with the amplitude of an output voltage fundamental being regarded as the present converter output voltage. The drive level is quoted as a percentage, from 0 to 100%. A modulation level is the ratio between the instantaneous and the maximum converter output voltage. This is defined for the instantaneous values of a phase voltage, for the entire converter or for one converter element, and has a value between −1 and +1.

The common-mode voltage has no significant influence on the load 11. However, it should be as small as possible and should change slowly, in order to reduce, inter alia, the voltage load on motor windings with respect to ground potential. The only governing factors for the behavior of the load 11 are the differences between the voltages at the AC voltage-side connections 10, also referred to as the differential mode.

For this reason, the common-mode voltage offers one degree of freedom for driving the load 11. According to the invention, this degree of freedom is used to influence the load flow between the converters and the intermediate-circuit capacitor voltages. In this case, instantaneous values of the intermediate-circuit capacitor voltages cannot be controlled, and all the that can be done is to regulate a mean value, over time, of each intermediate-circuit capacitor voltage over one fundamental cycle of the output voltages. The full drive level of 100% cannot be achieved either, since series-connected first and second power converters 4, 7 would need to emit power continuously to achieve this. The maximum drive level which can be achieved is a value of approximately 82% (amplitude of the output voltage as a ratio of the sum of the intermediate-circuit capacitor voltages of the series-connected first and second power converters 4, 7).

The influence of the common-mode voltage on the regulated voltages of the intermediate-circuit capacitances depends on the respective operating point of the circuit arrangement. The joint regulation, which is preferably sampling regulation, therefore has a mathematical converter model of the first and second power converters 4, 7. This model describes a change in the intermediate-circuit capacitor voltages as a function of the common-mode voltage and of further system variables, that is to say the predetermined load voltages and preferably measured load currents per phase:

$$\dot{U}_j[k] = \hat{I}_j(u_h[k], \vec{u}_{mot,ref}[k], \vec{i}_{mot}[k])C_j \in \{Cnp, Ca, Cb, Cc\} \quad (1)$$

$$\hat{U}_j[k+1] = U_j[k] + \dot{\hat{U}}_j[k] \cdot \Delta t j \in \{Cnp, Ca, Cb, Cc\} \quad (2)$$

In this case, [k] denotes the value of a variable at the k-th considered time in the sampling regulation. Estimated or calculated values are marked, in contrast to measured or predetermined values, with an inverted-v symbol such as that, for example, in Û·j∈{Cnp, Ca, Cb, Cc is an index of the capacitances considered with the regulated intermediate-circuit capacitor voltages, in particular with Cnp relating to the voltage at the first neutral point 31, and Ca, Cb, Cc relating to the voltages of the capacitances in the second DC voltage intermediate circuits 71 of the phases which are annoted a, b and c. Cnp is equal to the sum of the two capacitances in the first DC voltage intermediate circuit 3.

The variables are as follows:

$u_h$ is a variable which covers all possible values $\lfloor u_{h,min} \ldots u_{h,max} \rfloor$ of the common-mode voltage, $\vec{u}_{mot,ref}$ is a vector of the predetermined load voltages, $\vec{i}_{mot}$ is a vector of the load currents, $\hat{I}_j$ is a vector of the estimated currents in the capacitances under consideration, $C_j$ is a vector of the capacitances under consideration, $U_j$ is a vector of the voltages for the capacitances under consideration, $\hat{U}_j$ is an estimated value of $U_j$, $\dot{\hat{U}}_j$ is an estimated time derivative of $U_j$ and $\Delta t$ is the duration of one sampling time step.

Figure 7:
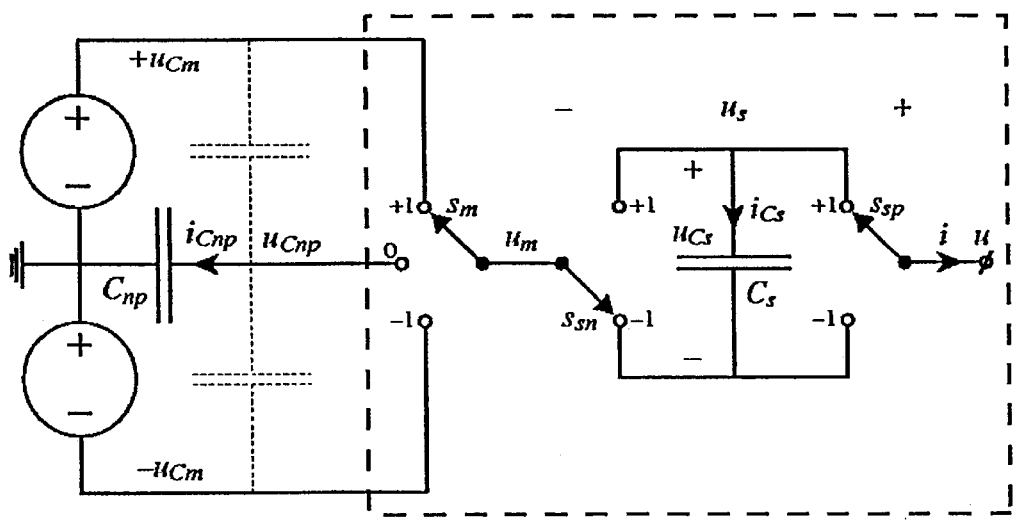
FIG. 7 shows an equivalent circuit, corresponding to one phase of a circuit arrangement according to the invention.

The process of determining $\hat{I}_j$ from $u_h[k]$ and $\vec{u}_{mot,ref}[k]$ and $\vec{i}_{mot}[k]$ includes the major portion of the converter model. The model is obtained in the following way, on the basis of an idealized consideration of the converter:

For a circuit arrangement as shown in FIG. 1, FIG. 7 shows an idealized equivalent circuit of the rectifier 2, of the first DC voltage intermediate circuit 3, of the first power converter 4 and of one of the second power converters 7.

In the equivalent circuit, the converter bridges are modeled as switches or changeover switches, and the two intermediate-circuit capacitors in the first DC voltage intermediate circuit 3 are combined to form an equivalent capacitance Cnp of the first neutral point 31. A positive or negative intermediate circuit voltage of the first DC voltage intermediate circuit 3 is $+u_{Cm}$ or $-u_{Cm}$, respectively, and a voltage at the first neutral point 31 is $+u_{Cnp}$. The switches in the main power converter bridge 41 are driven with a modulation level $s_m$, using pulse width modulation. The modulation level $s_m$ assumes values between +1 and −1, with a voltage $u_m$ at the load connection 5, under consideration, of the first power converter 4 being equal to $+u_{Cm}$ when $s_m=+1$, and being equal to $-u_{Cm}$ when $s_m=-1$. Corresponding values of $u_m$ are linear-interpolated for intermediate values of $s_m$.

The second power converter 7 with an intermediate-circuit capacitor voltage $u_{Cs}$ is driven with a modulation level $s_s$. The modulation level $s_s$ assumes values between +1 and −1, with a voltage $u_s$ between the first bridge connection 6 and the second bridge connection 8 of the second power converter 7 being equal to $+u_{Cs}$ for $s_s=+1$, and being equal to $-u_{Cs}$ for $s_s=-1$. The modulation level $s_s$ is composed of a modulation level $s_{sn}$ of the first converter bridge 72 and a modulation level $s_{sp}$ of the second converter bridge 73, where $$s_s = \frac{s_{sp} - s_{sn}}{2}$$

In principle, for a given modulation level $s_s$, any desired values may be chosen for $s_{sp}$ and $s_{sn}$, provided they satisfy the above equation. However, $s_{sn}=-s_{sp}$ is preferably chosen. This results in the switching losses and switched-on losses being distributed uniformly.

The carrier frequency for the pulse width modulation is considerably higher than the fundamental frequency of an output voltage from the circuit arrangement, so that the converters can be modeled as continuous apparatuses, as described in the article "PWM-control of multi-level voltage-source inverters", M. Veenstra and A. Rufer, Proceedings of the Power Electronics Specialists Conference, vol. 3, pp. 1387–1393, IEEE, 2000.

Figure 8:
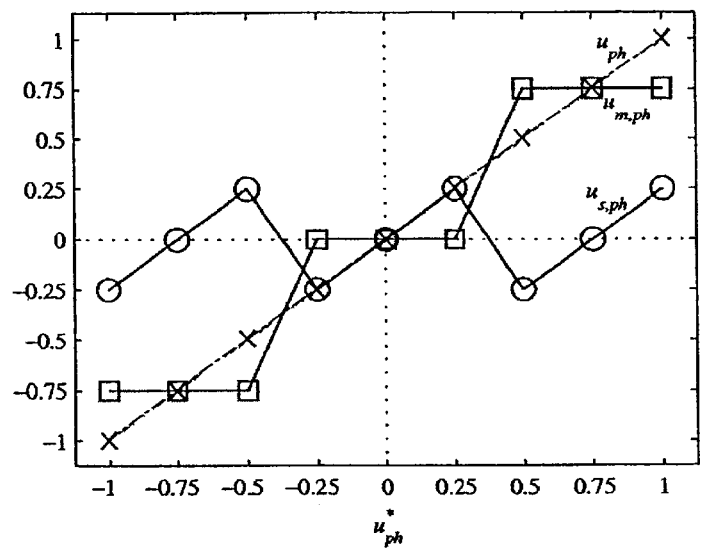
FIG. 8 shows a profile of converter voltages.

FIG. 8 shows a waveform of converter voltages for a single phase for varying modulation levels of the first power converter 4 and of the corresponding second power converter 7. In this case, $u_{ph}$ is the voltage at the corresponding second bridge connection 8, that is to say the sum of a voltage value $u_{m,ph}$ of the first power converter 4 and a voltage value $u_{s,ph}$ of the second power converter 7. An additional index ph for said voltages indicates that these are variables for one specific phase. The indicated voltages correspond to those from the table above for the arrangement with a voltage ratio of 3:1 with nine switching steps, normalized to a maximum resultant voltage of 4 kV. Table values for the voltage for the first power converter 4 are marked by squares, table values for the voltage from the second power converter are marked by circles, and table values for the total voltage are marked by crosses. The profile of the voltages between the table values is determined by linear interpolation.

Figure 9:
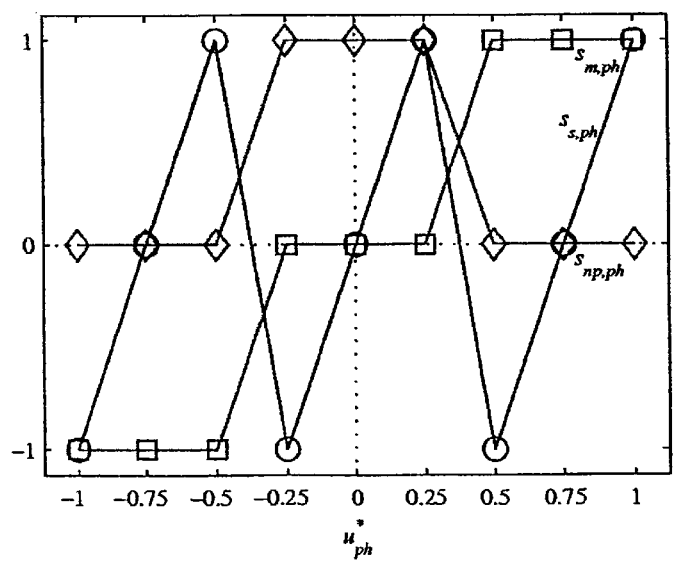
FIG. 9 shows a profile of modulation levels of converter bridges.

FIG. 9 shows a profile of modulation levels for converter bridges for producing the converter voltages shown in FIG. 8. This once again shows a profile of a modulation level $s_{np}$ at the first neutral point 31 and $s_{np}$ is defined as the relative probability over time of the first neutral point 31 being connected to the load connection 5. $s_{np}$ is thus directly dependent on $s_m$. Values for $s_{np}$ of different phases are combined to form a vector $\vec{s}_{np}$.

The curves in FIGS. 8 and 9 represent unique relationships, which associate a pair of voltage values $u_{m,ph}$, $u_{s,ph}$ from the first and second power converters 4, 7, as well as a group of three modulation levels $s_m$, $s_s$, $s_{sp}$ with each value $u_{ph}$ of a voltage at a second bridge connection 8 or at an AC voltage-side connection 10. Using these modulation levels, the estimated currents $\hat{I}_j$ into the intermediate-circuit capacitances under consideration at the k-th time under consideration are defined as $$\hat{i}_{C_{np}}[k] = -\vec{i}_{mot}[k] \cdot \vec{s}_{np}[k] \quad (3)$$

$$\hat{i}_{C_{s,ph}}[k] = -i_{ph}[k] s_{s,ph}[k] \forall ph \in \{a,b,c\} \quad (4)$$

Equation (3) means that a current in the equivalent capacitance is equal to the sum of the load currents, in each case multiplied by the modulation level $s_{np}$ at the first neutral point 31 with respect to the phase of the respective load current. Equation (4) means that, for each phase a,b,c in a three-phase system, a current in the intermediate-circuit capacitance of the second power converter 7 for the relevant phase is determined from the load current $i_{ph}$ in that phase, multiplied by the modulation level $s_{s,ph}$ of the second power converter 7 in that phase.

Equations 2 and 5 use k+1, since this is a prediction of the capacitor voltages for the next sampling time. Equations 3 and 4 use k, since these are measured and calculated currents and modulation levels to be set for this sampling time. However, these values from Equations 3 and 4 will not change, or will change only insignificantly, in the time interval up to the next sampling time. Similar arguments apply to Equations 6–9.

Any error between the regulated intermediate-circuit capacitor voltages and the predetermined, preferably constant, ideal values $U_{j,ref}$ are $$\varepsilon \hat{U}_j = \hat{U}_j[k+1] - U_{j,ref} \; j \in \{Cnp, Ca, Cb, Cc\} \quad (5)$$

The regulation is intended to keep these voltage errors as small as possible. The common-mode voltage and the rate of change $\dot{u}_h$ of the common-mode voltage should likewise be kept as small as possible.

$$u_h = u_h[k] \quad (6)$$

$$\dot{u}_h = (u_h[k] - u_h[k-1])/\Delta t \quad (7)$$

This is done by forming a cost function, by summation of the squares of the above errors:

$$K(u_h[k]) = k_{uh}(u_h)^2 + k_{duh}(\dot{u}_h)^2 + \sum_j \left(\varepsilon \hat{U}_j\right)^2 \quad j \in \{Cnp, Ca, Cb, Cc\} \quad (8)$$

Weighting factors $k_{uh}$ and $k_{duh}$ vary the weighting of errors in the common-mode voltage or its change in comparison to errors in the regulated voltages. The common-mode voltage which is chosen is that which minimizes the cost function.

$$u_h[k] = u_h[k]|_{K(u_h[k]) = min(K)} \quad (9)$$

A known minimization method is used to minimize the cost function. Methods such as these are implemented, for example, with an optimization "Toolbox" in the mathematical software packet MATLAB™ from The MathWorks Inc.

Thus, in the optimization process, that common-mode voltage is selected which minimizes a weighted sum of the squares of the errors between the regulated voltages and a respective nominal value. The weighting factors $k_{uh}$ and $k_{duh}$ are such that the intermediate-circuit capacitor voltages are regulated, averaged over time, at essentially constant values, and a variation in the common-mode voltage of, for example, a maximum of approximately 30% of the maximum converter output voltage is permissible.

During practical operation, the instantaneous values of the voltages of the capacitances oscillate by up to approximately 10% around the nominal voltage of the respective capacitance.

The method according to the invention thus comprises the following steps:

a) Presetting $\vec{u}_{mot,ref}[k]$ by higher-level regulation 52, 59.

b) Measurement of $\vec{i}_{mot}[k]$ c) Prediction of a change in the regulated intermediate-circuit capacitor voltages as a function of the common-mode voltage and of further system variables by means of a converter model of sampling regulation at a first sampling time. This is done by determining $\hat{u}_j$ in accordance with Equation (1) in that:

1. $u_h[k]$ is predetermined by means of the optimization method,

2. $\vec{u}_{mot,ref}[k]$ and $u_h[k]$ are added, which results in the modeled output voltage $u_{ph}$ for each phase, 3. Modulation levels $s_m$, $s_s$, $s_{np}$ are determined for each phase, in accordance with the relationships shown in FIGS. 8 and 9, 4. The estimated currents $\vec{I}_j$ in the intermediate circuit capacitances under consideration are determined using Equations (3) and (4), 5. The estimated time derivative of of $\hat{U}_j$ is determined using Equation (1), and 6. The change $\dot{\hat{u}}_j[k] \cdot \Delta t$ in $U_j$ and the new estimated value $\hat{u}_j[k+1]$ are determined using Equation (2).

d) Determination of a common-mode voltage which minimizes the cost function in accordance with Equations (5–8) at at least one next sampling time, by means of an optimization process. Step c) is carried out repeatedly, with $u_h[k]$ being varied by means of the optimization method.

e) Addition of the optimized common-mode voltage, determined in step d), to load voltage nominal values 55, 58 (which are determined for driving the load) at the AC voltage-side connections 10, thus resulting in modified load voltage nominal values for the respective AC voltage-side connections 10, f) Driving or modulation of the first power converter 4 and of the at least one second power converter 7 on the basis of these modified load voltage nominal values.

If the circuit arrangement does not have any redundant switching states, the regulation according to the invention results in the regulated voltages oscillating about the nominal value. The regulation in this case stabilizes the mean values of the voltages over one fundamental cycle, and minimizes the amplitude of the voltage oscillations, which is sufficient for operation of the circuit arrangement. The amplitudes of the oscillations depend on the values of the respective capacitances and on the real power being transmitted. By way of example, for a converter with a rating of 1.4 MVA and with capacitor voltages of 3 and 1 kV, this results in a voltage ratio of 3:1 and nine switching steps, with the capacitance of the first DC voltage intermediate circuit 3 being a total of 775 microfarads, and the capacitance of one individual second power converter 7 in each case being 4650 microfarads, and with the neutral point voltage and the intermediate-circuit capacitor voltages of the second power converters 7 each oscillating by a maximum of 10% about their nominal values. In this case, an energy storage capacitance in the first DC voltage intermediate circuit 3 amounts to a total of 5 Ws/kVA, and an energy storage capacitance for all the second power converters 7 likewise amounts to a total of 5 Ws/kVA. The variation of the common-mode voltage is a maximum of about 30% of the maximum converter output voltage.

The circuit arrangement according to the invention is suitable for new systems, but is also suitable for retrofitting existing drives. In order to protect a drive against the increased common-mode voltage, the end winding insulation is improved, for example, by spraying on corona-discharge protection.

For load voltage frequencies which are below a nominal frequency, the amplitude of the load voltage is also reduced in a known manner for supplying a motor. The regulation of the intermediate-circuit capacitor voltages at the AC voltage-side connections 10 becomes more difficult at these lower voltages. In this case, the optimization of the regulation preferably takes into account a prediction of the converter response over two or more sampling steps. The cost function in this case includes the sum of the squares of the errors under consideration for each of the sampling steps. Appropriate optimization methods are known from the field of model predictive control.

In one preferred variant of the invention, the cost function also has at least one term with the time integral of one of the voltage errors under consideration. This eliminates any steady-state error between the corresponding voltage and its nominal value.

The method according to the invention is adapted as appropriate for other variants of the circuit arrangement. For example, if the first power converter 4 is a two-point power converter, the term $\epsilon\hat{U}_{NP}$ is eliminated from the cost function.

In a further embodiment of the invention, the circuit arrangement according to the invention is arranged between the power supply network 1 and the first DC voltage intermediate circuit 3, and is thus used mainly as a rectifier, with feedback capability, for supplying the first DC voltage intermediate circuit 3. In this application, the joint regulation regulates the overall voltage of the first intermediate circuit instead of the operating point for the load. The load currents $\vec{i}_{mot}$ correspond in this case to network currents, and network-side regulation 59 is used instead of the higher-level load regulation 52.

Figure 6:
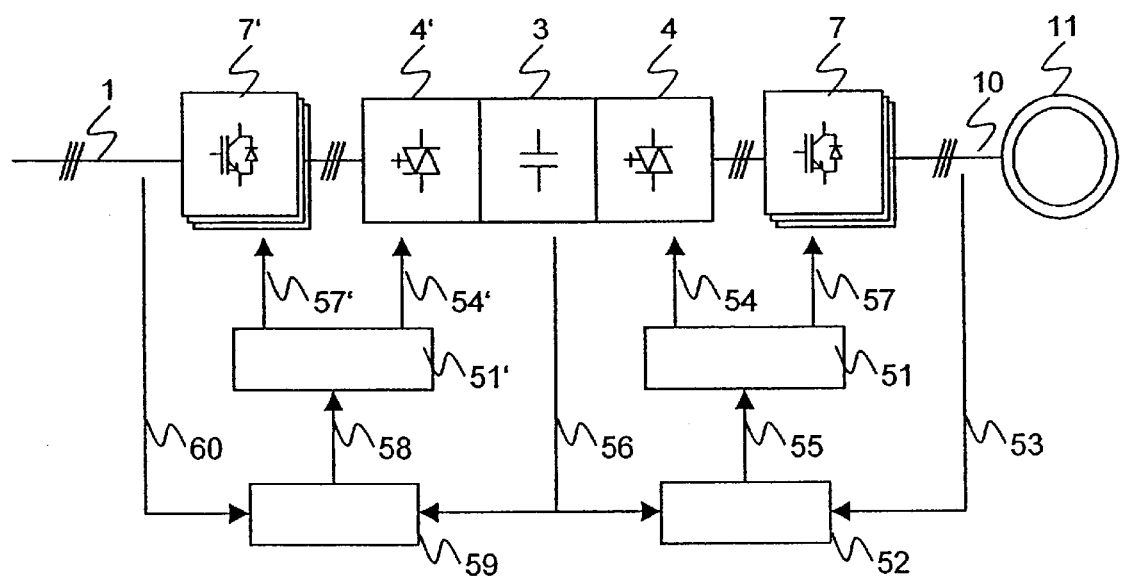
FIG. 6 shows a control diagram of regulation according to the invention in conjunction with a further embodiment of the circuit arrangement according to the invention.

FIG. 6 shows a control diagram of regulation according to the invention in conjunction with this further embodiment. The rectifier 2 and the network transformer 12 are thus replaced by a further first power converter 4' and a further second power converter 7'. AC voltage-side connections 10 of the further second power converters 7' are connected to the power supply network 1 without a transformer. The further first and second power converters 4', 7' are driven by means of a further modulation level 54' of the further first power converter 4', or further modulation levels 57' of the further second power converters 7'. These modulation levels are produced by a further intermediate-circuit voltage regulator 51' on the basis of the network-side output voltage nominal values 58, which are in turn produced by network-side regulation 59. The network-side regulation 59 governs the network-side output voltage nominal values 58 on the basis of measured intermediate-circuit voltage values 56 and network voltage values 60. The network-side regulation 59 cannot influence the network voltage, but controls the power flow into the first DC voltage intermediate circuit 3 so that its overall voltage is kept essentially constant.

The power supply network 1 has a constant voltage and frequency, which correspond to the rated operating point of the further first power converter 4' in conjunction with the further second power converter 7'. These are thus always operated at least approximately at this operating point, in which case the network-side common-mode voltage can be kept very low by means of the further intermediate-circuit voltage regulator 51', for example at a maximum of 5% of the maximum converter output voltage.

Voltages from preferably all the intermediate-circuit capacitors in the further first power converter 4' and in the further second power converters 7' are measured, and are also processed in the further intermediate-circuit voltage regulator 51'.

If the circuit arrangement is arranged between the power supply network 1 and the first DC voltage intermediate circuit 3, the frequency of the voltages at the AC voltage-side connections 10 corresponds to a constant network frequency. In this case, the common-mode voltage is very low, that is to say it is a maximum of approximately 5% of the maximum converter drive level.

In summary, the intermediate-circuit voltage regulator 51 regulates the neutral point voltage of the first DC voltage intermediate circuit 3, the intermediate-circuit capacitor voltages of the second power converters 7 and the common-mode voltage at the load 11, and the further intermediate-circuit voltage regulator 51' regulates the neutral point voltage of the first DC voltage intermediate circuit 3, the intermediate-circuit capacitor voltages of the further second power converters 7', and the common-mode voltage with respect to the network 1.

There are various options for regulating the neutral point voltage of the first DC voltage intermediate circuit 3, as follows:

1. The first DC voltage intermediate circuit 3 has two independent neutral points, that is to say neutral points which are not connected, with one neutral point on the network side and one on the load side. As in the case of a diode rectifier, the power is transmitted only via the first positive pole 32 and the first negative pole 33. Each side regulates its own neutral point voltage.

2. Only one of the two sides regulates a common neutral point voltage, and the other side does not consider this in the optimization process.

3. Both sides consider the neutral point voltage and try to prevent it from deviating too far from its nominal value. By way of example, the neutral point voltage is taken into account with a reduced weighting in both optimization processes with the result that it is not regulated excessively. The weighting is different, for example, for the two sides.

4. The circuit arrangement has a global intermediate-circuit voltage regulator, which minimizes a cost function including all the intermediate circuit voltages and both common-mode voltages in the entire circuit arrangement shown in FIG. 5.

The further embodiment of the invention as shown in FIG. 5 allows the circuit arrangement to be used without a network transformer, which means a major simplification. The circuit arrangement according to the invention can, of course, also be used as only a network-side circuit arrangement 7',4',3 with a DC voltage load and without the load-side circuit arrangement 4,7.

If the second power converters 7 contain three-point inverters and/or if a number of second power converters 7 are connected in series in each phase, then the cost function correspondingly contains at least one additional term for each additional capacitance and for each regulated voltage.

If the circuit arrangement has redundancies, the optimization process also takes account of redundant switching states. Since, in this case, a predetermined common-mode voltage does not uniquely correspond to a single drive level for the converters, multidimensional optimization is carried out. This means that the optimization process varies both the common-mode voltage and the redundant switching states. In this case, the optimization process reduces both the common-mode voltage and the number of switching processes, that is to say processes for switching semiconductor switches on or off. In principle, in this case, the redundant switching states mean that the common-mode voltage can be reduced to a greater extent and/or the number of switching processes can be reduced. In order to minimize switching losses in one preferred variant of the invention, the number of switching processes is minimized, and the common-mode voltage is allowed to vary.

LIST OF REFERENCE SYMBOLS

1 Power supply network
2 Rectifier
3 First DC-voltage intermediate circuit
4 First power converter
4' Further first power converter
5 Load connection of the first power converter
6 First bridge connection
7 Second power converter
7' Further second power converter
7a First second power converter
7b Second second power converter
8 Second bridge connection
9 Filter
10 AC voltage-side connection
11 Load
12 Network transformer
31 First neutral point
32 First positive pole
33 First negative pole
41 Main converter bridge
51 Intermediate-circuit voltage regulator
51' Further intermediate-circuit voltage regulator
52 Higher-level load regulation
53 Output voltage values
54 Modulation level of the first power converter
54' Further modulation level of the further first power converter
55 Load voltage nominal values
56 Intermediate-circuit voltage values
57 Modulation levels of the second power converters
57' Further modulation levels of the further second power converters
58 Network-side output voltage nominal values
59 Network-side regulation
60 Network voltage values
71 Second DC voltage intermediate circuit
72 First converter bridge
73 Second converter bridge
74 Second neutral point

What is claimed is:

1. A power-electronic circuit arrangement for transmitting real power from a DC voltage-side to at least two AC voltage-side connections or vice versa, comprising
a first power converter which is connected to a DC voltage source with a first intermediate-circuit capacitor voltage and has at least two load connections,
and at least one second power converter, which is connected to one of the load connections and is connected to an AC voltage-side connection, and which has a second intermediate-circuit capacitor voltage and in which case, by means of the second power converter, one or more of: the positive second intermediate-circuit capacitor voltage, the negative second intermediate-circuit capacitor voltage or zero volts can be added to a voltage value which can be connected by the first power converter to its load connection,
wherein the at least one second power converter does not have its own power supply means.

2. The circuit arrangement as claimed in claim 1, wherein the circuit arrangement has a regulating device for joint regulation of at least one intermediate-circuit capacitor voltage of the at least one second power converter, and a common-mode voltage at the AC voltage-side connections of the circuit arrangement, as well as means for driving semiconductor switches in the first power converter and in the at least one second power converter on the basis of output variables from this regulating device.

3. The circuit arrangement as claimed in claim 2, wherein the regulating device is designed for regulating an intermediate-circuit capacitor voltage of the first power converter.

4. The circuit arrangement as claimed in claim 2, wherein the regulating device is designed for minimizing a weighted sum of the squares of the errors between the regulated intermediate-circuit capacitor voltages, the common-mode voltage and any rate of change of the common-mode voltage and a respective nominal value.

5. The circuit arrangement as claimed in claim 2, wherein the regulating device has a converter model for predicting the regulated intermediate-circuit capacitor voltages as a function of the common-mode voltage and of further system variables.

6. The circuit arrangement as claimed in claim 1, wherein two second power converters are in each case connected in series between a load connection and an AC voltage-side connection, with each of these second power converters being connected via a first bridge connection of a first converter bridge and via a second bridge connection of a second converter bridge, and having a second DC voltage intermediate circuit with a second intermediate-circuit capacitor voltage, which is connected in parallel with the first and second converter bridges.

7. A method for transmitting real power by means of power-electronic circuit arrangement from a DC voltage side to at least two AC voltage-side connections of the circuit arrangement, or vice versa, with
   a) an associated voltage value being connected to each of at least two load connections of the first power converter by means of said first power converter, which is connected to a DC voltage source with a first intermediate-circuit capacitor voltage,
   b) one or more of: the positive second intermediate-circuit capacitor voltage, the negative second intermediate-circuit capacitor voltage or zero volts being added to the voltage value of the load connection by means of at least one second power converter, which is connected to one of the load connections and is connected to an AC-voltage side connection and has a second intermediate-circuit capacitor voltage, wherein
   c) at least one intermediate-circuit capacitor voltage of the at least one second power converter and one common-mode voltage of the AC voltage-side connections of the circuit arrangement are regulated by means of joint regulation, and
   d) semiconductor switches for the first power converter and for the at least one second power converter are driven on the basis of output variables from this regulating device.

8. The method as claimed in claim 7, wherein the joint regulation regulates an intermediate-circuit capacitor voltage of the first power converter.

9. The method as claimed in claim 7, wherein a cost function, which is a weighted sum of the squares of the errors between the regulated voltages and a respective nominal value, is minimized, so that the regulated intermediate-circuit capacitor voltages are regulated, averaged over time, essentially at constant values, and in that variation of the common-mode voltage is permissible.

10. The method as claimed in claim 7, wherein a cost function, which is a weighted sum of the squares of the errors between the regulated voltages and a respective nominal value, is minimized, so that the regulated intermediate-circuit capacitor voltages are regulated, averaged over time, essentially at constant values, and in that any variation of the common-mode voltage is minimized.

11. The method as claimed in claim 9, wherein the following steps are carried out:
    a) prediction of a change in the regulated intermediate-circuit capacitor voltages as a function of the common-mode voltage and of further system variables by means of a converter model for sampling regulation at a first sampling time,
    b) the establishment of a common-mode voltage, which minimizes the cost function at at least a next sampling time, by means of optimization,
    c) the addition of this common-mode voltage to load voltage nominal values, which are predetermined for driving the load, of the AC voltage-side connections, thus resulting in modified load voltage nominal values at the respective AC voltage-side connections,
    d) driving or modulation of the first power converter and of the at least one second power converter on the basis of these modified load voltage nominal values.

* * * * *